(12) United States Patent
Jacob et al.

(10) Patent No.: US 8,540,286 B2
(45) Date of Patent: Sep. 24, 2013

(54) CONNECTION DEVICE FOR A MOULDING CORE FOR PRODUCING A FIBRE COMPOSITE COMPONENT

(75) Inventors: Torben Jacob, Beckdorf (DE); Joachim Piepenbrock, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 486 days.

(21) Appl. No.: 12/309,578

(22) PCT Filed: Jul. 23, 2007

(86) PCT No.: PCT/EP2007/057550
§ 371 (c)(1),
(2), (4) Date: Oct. 8, 2009

(87) PCT Pub. No.: WO2008/015115
PCT Pub. Date: Feb. 7, 2008

(65) Prior Publication Data
US 2010/0028480 A1    Feb. 4, 2010

Related U.S. Application Data

(60) Provisional application No. 60/834,459, filed on Jul. 31, 2006.

(30) Foreign Application Priority Data

Jul. 31, 2006  (DE) .......................... 10 2006 035 619

(51) Int. Cl.
*F16L 47/12*    (2006.01)
*F16L 47/08*    (2006.01)

(52) U.S. Cl.
USPC ............. 285/87; 285/81; 285/255; 425/451.9

(58) Field of Classification Search
USPC ................... 285/243, 255, 320, 337, 409, 81, 285/82, 87; 425/451.9
See application file for complete search history.

(56) References Cited

U.S. PATENT DOCUMENTS 483,987 A * 10/1892 Balbian .......................... 137/349
685,851 A * 11/1901 Kifer et al. .................... 285/311

(Continued)

FOREIGN PATENT DOCUMENTS

| CH | 459549 | 7/1968 |
| DE | 3921443 | 1/1991 |

(Continued)

OTHER PUBLICATIONS

International Search Report for PCT/EP2007/057550 dated Oct. 15, 2007.

(Continued)

*Primary Examiner* — James Hewitt
(74) *Attorney, Agent, or Firm* — Jenkins, Wilson, Taylor & Hunt, P.A.

(57) ABSTRACT

Connection devices for a moulding core for producing a fibre composite component are provided. Such a connection device can include a base element for receiving a coupling portion of the moulding core for subjecting the moulding core to a medium, a clamping element for fixing and sealing the coupling portion of the moulding core on the base element, and a locking mechanism for locking the clamping element with respect to the base element and the coupling portion of the moulding core.

6 Claims, 5 Drawing Sheets

(56) References Cited

U.S. PATENT DOCUMENTS

| | | | | |
|---|---|---|---|---|
| 1,926,949 A | * | 9/1933 | Kennedy | 285/374 |
| 2,183,895 A | * | 12/1939 | Reed | 285/87 |
| 3,424,830 A | | 1/1969 | Sfondrini et al. | |
| 3,807,774 A | * | 4/1974 | Heath, Jr. | 285/87 |
| 3,858,915 A | * | 1/1975 | De Vincent et al. | 285/320 |
| 4,389,367 A | | 6/1983 | Hudson | |
| 4,554,949 A | * | 11/1985 | Sell | 137/899 |
| 4,632,432 A | * | 12/1986 | Reneau | 285/24 |
| 4,828,781 A | | 5/1989 | Duplessis et al. | |
| 5,016,895 A | * | 5/1991 | Hollingsworth et al. | 280/280 |
| 5,816,623 A | * | 10/1998 | Chang | 285/88 |
| 6,053,540 A | * | 4/2000 | Meyer | 285/88 |
| 2004/0000792 A1 | | 1/2004 | Carhuff | |

FOREIGN PATENT DOCUMENTS

| | | |
|---|---|---|
| GB | 2292332 | 2/1996 |
| SU | 1710452 A2 | 2/1992 |

OTHER PUBLICATIONS

Decision on Grant from the Russian Patent Office for Application No. 2009105686/05(007598) dated Aug. 16, 2011.

\* cited by examiner

CONNECTION DEVICE FOR A MOULDING CORE FOR PRODUCING A FIBRE COMPOSITE COMPONENT

TECHNICAL FIELD

The present invention relates to a connection device for a moulding core for producing a fibre composite component, in particular for aerospace.

BACKGROUND

Although it can be applied to any desired fibre composite components, the present invention and the problems on which it is based are explained in more detail below with reference to two-dimensional stringer-stiffened carbon fibre reinforced plastic (CRP) components, for example skin shells of an aircraft.

It is state of the art to stiffen CRP skin shells with CRP stringers in order to withstand the loads occurring in aircraft construction with the lowest possible additional weight. In this respect, a distinction is made essentially between two types of stringers: T and Ω stringers.

The cross section of T stringers is made up of the base and the stem. The base forms the connecting surface with respect to the skin shell. The use of skin shells stiffened with T stringers is widespread in aircraft construction.

Ω stringers have something like a hat profile, its ends being connected to the skin shell. Ω stringers may either be adhesively attached in the cured state to the likewise cured shell, or be cured wet-in-wet at the same time as the shell. The latter is desired, because it is more favourable from technical aspects of the process. However, supporting or moulding cores are necessary for the wet-in-wet production of skin shells stiffened with Ω stringers, in order to fix and support the dimensionally unstable semifinished fibre products in the desired Ω shape during the production process. Skin shells with Ω stringers have the advantage over T stringers that they allow better infiltration during an infusion process for introducing a matrix, for example an epoxy resin, into the semifinished fibre products. Infusion processes may be inexpensive in comparison with other known methods for producing fibre composite components, such as the prepreg process for example, because they allow the use of lower-cost semifinished fibre products.

However, there is the problem with the production of Ω stringers that, when they are applied and/or removed after the forming of the Ω stringers, certain supporting or moulding cores have to be subjected to a medium which on the one hand makes it possible or easier to help them to retain their shape when they are applied and on the other hand makes it possible or easier to remove them. Therefore, such moulding cores are accordingly connected with preference to a medium source.

The document GB 2 292 332 A describes a moulding method and a device with which an elastomer mould bag is arranged in a mould. The elastomer mould bag is connected by its inlet to a connection, a closure cap, of a vent line and to a valve. The mould also has a vacuum channel.

The document U.S. Pat. No. 4,389,367 describes a fluid moulding system for producing moulding cores for moulded components. When a component is produced with the moulding cores, the moulding cores are connected to a vacuum source by means of plugs and lines.

SUMMARY

Against this background, the present invention is based on the object of providing a connection device for a moulding core for producing a fibre composite component, in particular for aerospace.

Accordingly, a connection device is provided for a moulding core for producing a fibre composite component, in particular for aerospace, comprising a base element for receiving a coupling portion of the moulding core for subjecting the moulding core to a medium; a clamping element for fixing and sealing the coupling portion of the moulding core on the base element; and a locking mechanism for locking the clamping element with respect to the base element and the coupling portion of the moulding core.

Consequently, the present invention has the advantage that, in the production of a fibre composite component, a moulding core can be connected to a medium source easily and quickly by means of the connection device according to the invention. A further advantage of the present invention is that it forms a standardized interface between a medium source and a moulding core by means of the coupling portion, making it possible to obtain uniformity and reduce the variety of parts.

Advantageous refinements and improvements of the present invention can be found in the subclaims.

In a preferred embodiment, it is provided that the coupling portion of the moulding core is a portion of the moulding core or a transitional element with respect to the moulding core. This advantageously broadens the range of use of the connection device, since moulding cores of different types can also be connected, it being preferred for the base element to have a receiving portion for the coupling portion with an external cross-sectional shape that is formed such that it complements the internal cross-sectional shape of the coupling portion.

In a further preferred embodiment, the clamping element is displaceably guided on the base element. This produces an advantageously simple form of movement for the connection and for locking the coupling portion, in respect of which it is provided with particular preference that the clamping element can be displaced by the locking mechanism into a first position, for releasing the coupling portion received in the receiving portion of the base element, and into a second position, for locking the clamping element with respect to the base element and the coupling portion. Advantageously easy and quick handling of the connection device is achieved by this.

In a further embodiment, at least one sealing element is arranged between the base element and the clamping element for sealing the coupling portion with respect to the base element and the coupling portion. This sealing element makes easy and quick sealing possible in the locking operation.

Yet a further preferred embodiment provides that the base element has at least one aperture for subjecting the moulding core to a medium. As a result, an advantageously simple connection to a medium source is created by the connection device.

In a further embodiment, the base element has at least one connecting mechanism for the transmission of electrical energy from an energy source to an electrical unit of the moulding core. Consequently, the range of use of the connection device is advantageously broadened to those moulding cores that for example have internal electric heating.

It is particularly preferred for the locking mechanism to have a clamping device with a clip and a lever, since advantageously easy operation and handling of the locking function and sealing is thereby created.

In yet a further embodiment, the aperture of the base element is formed for guiding and securing at least one tool for working the moulding core and/or its interior space, which makes it possible for the range of use of the connection device to be additionally broadened advantageously to moulding cores that require mechanical working for their removal.

BRIEF DESCRIPTION OF THE DRAWINGS

The invention is explained in more detail below on the basis of the exemplary embodiment represented in the schematic figures of the drawing, in which.

DETAILED DESCRIPTION OF THE INVENTION

Figure 1:
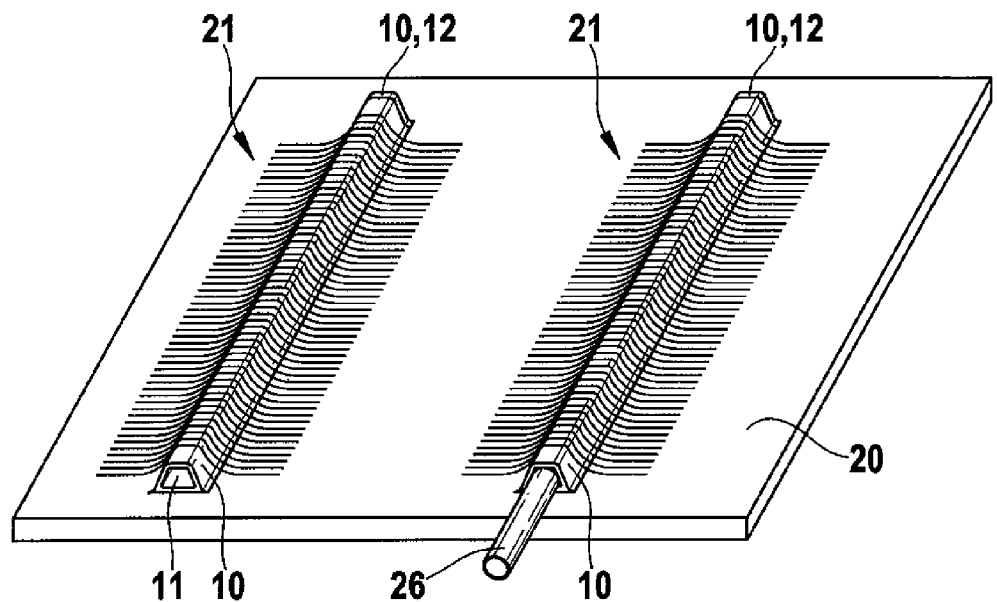
FIG. 1 shows a schematic perspective view of fibre composite components with moulding cores.

In all the figures of the drawing, elements that are the same or functionally the same have in each case been provided with the same reference numerals, unless otherwise indicated.

FIG. 1 shows a schematic perspective view of fibre composite components 21 with moulding cores 10.

This example has two moulding cores 10, the number not being restricted to two. The two moulding cores 10, the production of which is not explained any further, are arranged with an approximately trapezoidal cross section with their underside resting on a base plate 20.

To form the fibre composite components 21, semifinished fibre products are placed on the moulding cores 10. The semifinished fibre products rest with a middle portion on the outer surface of the moulding cores 10 and with their ends on the base plate 20, for example on an aircraft skin. As a result, in this example two moulded portions of the fibre composite component 21 are formed.

Various production methods may be used for processing the fibre composite material. Preferably, what is known as the vacuum infusion method is chosen here. However, the prepreg method can equally be used here.

Consequently, in the present exemplary embodiment the vacuum infusion method is used to introduce what is known as a matrix, for example synthetic resin, into the semifinished fibre product.

A further step is that of curing the base plate 20 with the moulding cores 10 and the semifinished product under the effect of heat and pressure in an autoclave, according to a curing cycle not explained any further, whereby the complete fibre composite component 21 is produced.

The moulding cores 10 respectively have at their rear end a closure 12, which is explained further below. At the front end of the left-hand moulding core 10, a trapezoidal opening to an interior space 11 can be seen. The front end of the right-hand moulding core 10 is provided with a coupling portion 26, which has a circular cross section. When producing the fibre composite component 21, this type of moulding core 10 is subjected to a certain, predeterminable internal pressure by a medium, in order to ensure dimensional stability of the moulding core 10 during production. When it is removed from the mould after production of the fibre composite component 21, that is to say after it has cured, the moulding core 10 is subjected to a different internal pressure, for example to a vacuum, whereby the cross section of the moulding core 10 shrinks by a certain amount, which depends on its structural design, which is not to be discussed any further. The moulding core 10 of reduced cross section can be removed advantageously easily from the fibre composite component 21 that has been produced.

Serving for subjecting the moulding core 10 to a medium is the coupling portion 26, which is either separately moulded onto the moulding core 10, as shown in the case of the right-hand moulding core 10 in FIG. 1, or may be a portion of the moulding core 10, as indicated on the left in FIG. 1.

Figure 2:
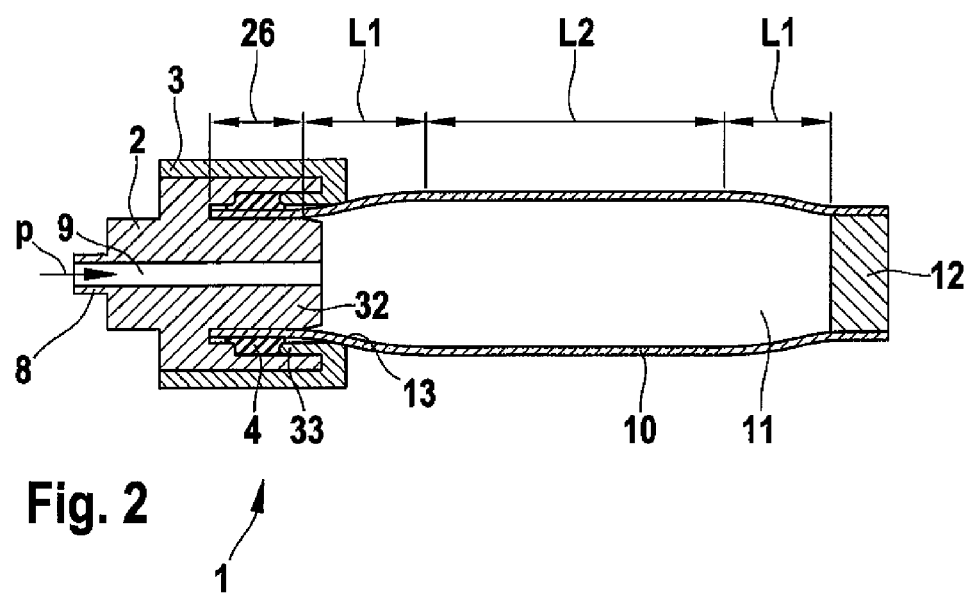
FIG. 2 shows a schematic sectional view of a first exemplary embodiment of a connection device according to the invention when it is subjected to a medium.

For this purpose, the coupling portion 26 is coupled to a connection device 1, as represented in FIG. 2 in a schematic sectional view of a first exemplary embodiment. No fibre composite component 21 is shown here.

In this example, the moulding core 10 has a useful length L2, which is occupied by the semifinished fibre product for forming the fibre composite component 21 as shown in FIG. 1. This is followed on both sides by a transitional length L1, which is arranged outside the fibre composite component 21 to be produced. On the right-hand side, one end of the moulding core 10 is closed in a sealed manner by the closure 12, in a way not shown any more specifically.

Shown on the left-hand side of the moulding core 10 is the coupling portion 26 of the moulding core 10, which is inserted in the connection device 1 on a receiving portion 32 of a base element 2. The receiving portion 32 is preferably provided with an external cross-sectional shape which complements the internal cross section of the coupling portion 26 of the moulding core 10.

Extending around the receiving portion 32 is an outer portion of the base element 2, on which a clamping element 3 is guided displaceably in the longitudinal direction of the base element 2. The clamping element 3 engages around the outer portion of the base element 2 with a pressure portion 33, which runs parallel to the outer wall of the clamping element in the longitudinal direction of the moulding core 10 and of the base element 2. Arranged in the region of the receiving portion 32 of the base element 2 is a sealing element 4, which seals the base element 2 with respect to the coupling portion 26 of the moulding core 10 when the clamping element 3 is in a certain position, the sealing element 4 being compressed. This sealing function is explained in more detail further below.

The clamping element 3 has on its side facing the moulding core 10 a first bevel 13, which makes it easier for the coupling portion 26 to be inserted into the connection device 1.

The base element 2 is provided with an aperture 9, which extends from a connection 8 on the left-hand side through the base element 2 into the receiving portion 32 and forms a connection of the connection 8 to the interior space 11 of the moulding core 10. The connection 8 is connected to a medium source (not shown) with a pressure p. The interior space 11 of the moulding core 10 is subjected to the pressure p by the medium source via the aperture 9, whereby the useful length L2 of the moulding core 10 is increased in dependence on the pressure p. This increase may for example have the desired inner dimensions of the fibre composite component 21.

It is easy to imagine that, when the pressure p is removed, the moulding core 10 shrinks by a certain amount, which can also be established by its own construction. When subjected to a pressure p, which is a negative pressure, such shrinkage is assisted and intensified. In this case, withdrawing the moulding core 10 from the completed fibre composite component 21 is advantageously made easier.

FIG. 2 shows a detailed schematic sectional view of the first exemplary embodiment of the connection device 1 according to the invention in a first position, in which the connection device is pushed with the receiving portion 32 of the base element 2 into the coupling portion 26 of the moulding core 10. A second bevel 15, on the side of the receiving portion 32 facing the moulding core 10, makes it easier for it to be pushed in.

A front edge of the coupling portion 26 of the moulding core 10 thereby butts against a first shoulder 16 of the base element 2, which is arranged at the end of the receiving portion 32.

In the middle region of the receiving portion 32, the sealing element 4 is arranged in such a way that its outer surface presses against a first sealing surface 18 of the outer portion of the base element 2, which surrounds the receiving portion 32. In this case, the sealing element 4 lies against a second shoulder 17 axially in the longitudinal direction of the connection device 1, which is arranged here at a distance from the first shoulder 16. In this first position, the clamping element 3 has been displaced to the right in the direction of the moulding core 10, its pressure portion 33 not touching the sealing element 4, or only slightly, with an edge 14 facing the sealing element 4.

Figure 3:
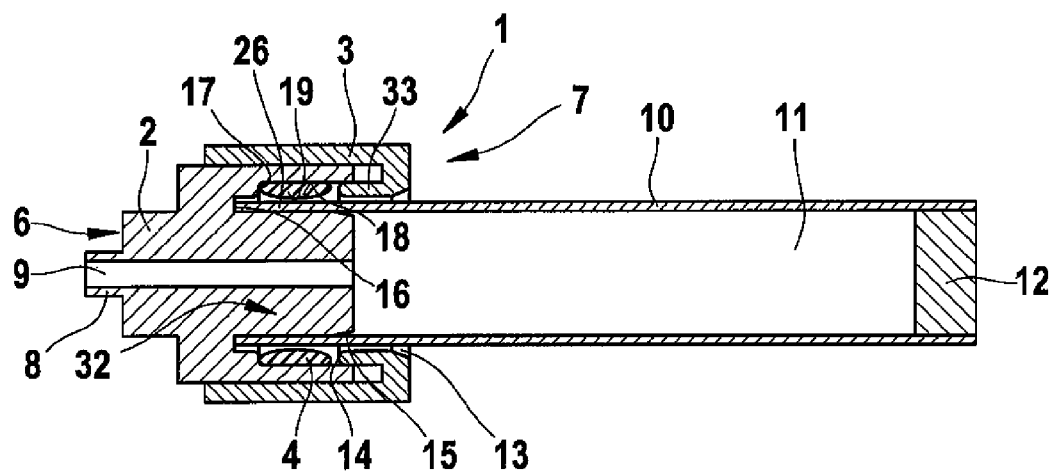
FIG. 3 shows a detailed schematic sectional view of the first exemplary embodiment of the connection device according to the invention in a first position.
Figure 4:
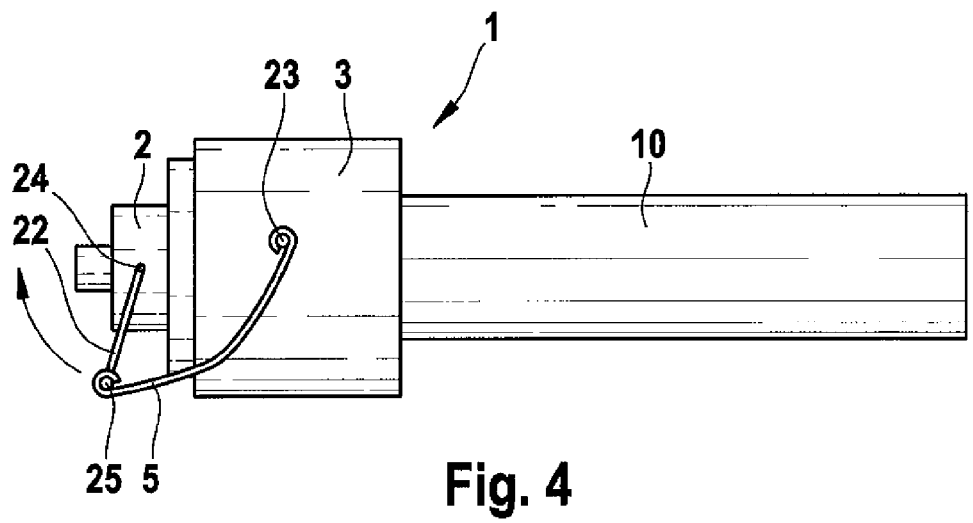
FIG. 4 shows a schematic side view of the first exemplary embodiment as shown in FIG. 3 in the first position.

The clamping element 3 is connected to the base element 2 by means of a locking mechanism 5, as shown in FIG. 4 in a side view of FIG. 3.

Figure 5:
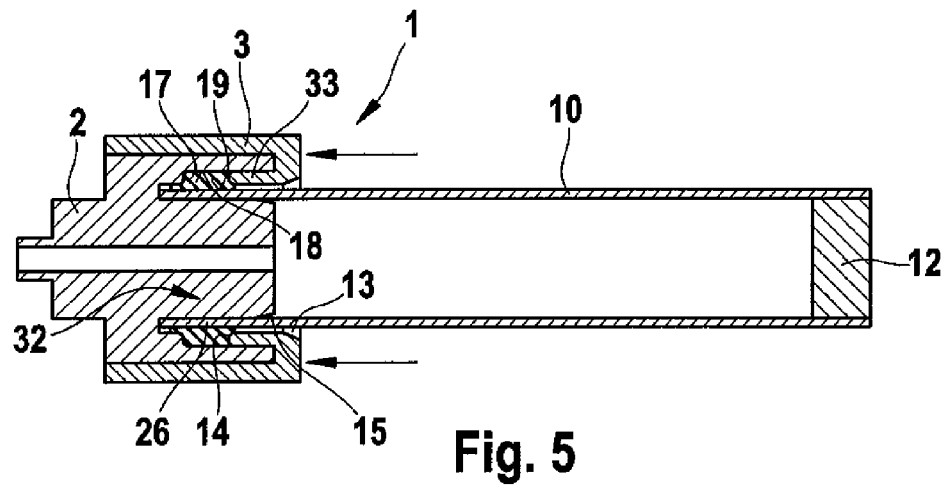
FIG. 5 shows a schematic sectional view of the first exemplary embodiment as shown in FIG. 3 in a second position.

The locking mechanism 5 has a clip, which is pivotably attached to the clamping element 3, on the outer wall of the latter, at a first pivoting point 23, and is pivotably attached to the base element 2 by means of one end of a lever 22, at a second pivoting point 24. In this case, the lever 22 is pivotably coupled by the other end to the clip of the clamping mechanism 5, at a third pivoting point 25. The arrow in FIG. 4 indicates a direction of movement in which the lever 22 is pivoted about the second pivoting point 24 when a pressure is exerted on it or on the locking mechanism 5, that is to say on the clip. The clamping element 3 is then displaced to the left and is securely held in a second position, namely the locking position, by the locking mechanism 5. This is shown in FIG. 5 in a sectional view similar to FIG. 3 and is shown in FIG. 6 in a side view similar to FIG. 4.

Figure 6:
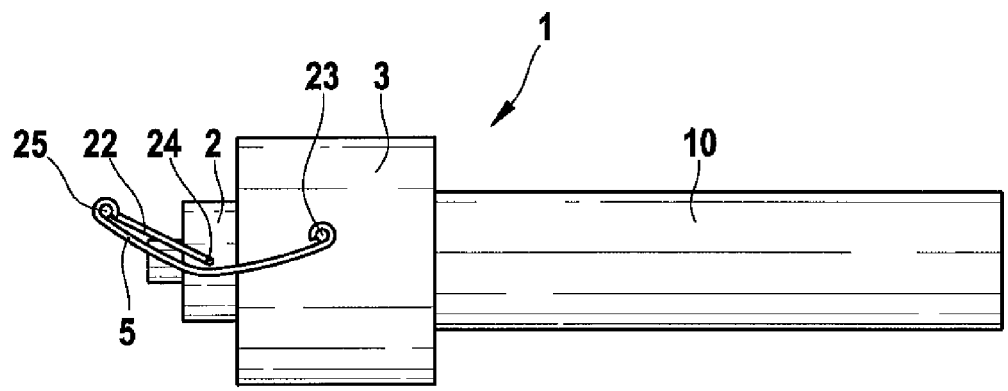
FIG. 6 shows a schematic side view of the first exemplary embodiment as shown in FIG. 5 in the second position.

In FIG. 6, the direction of a force produced by the locking mechanism 5, by which the clamping element 3 is displaced with respect to the base 2 in the second position shown here, is indicated by two arrows in the direction of the clamping element 3. In this case, the edge 14 of the pressure portion 33 presses the sealing element 4 against the second shoulder 17, the sealing element 4 being compressed in such a way that it rests in a sealing manner on a second sealing surface 19 on the coupling portion 26 of the moulding core 10 and on the first sealing surface 18 on the base element 2. Consequently, the base element 2 is locked and sealed with the clamping element 3 and the coupling portion 26 of the moulding core 10.

The position of the locking mechanism 5 that is associated with the locking position, that is to say in the second position of the connection device 1, is shown in FIG. 6. Releasing the position of the locking mechanism 5 can be easily carried out, by exerting on the lever 22 a force which pivots it anticlockwise about the third pivoting point 24.

Consequently, advantageously quick and easy locking of the connection device 1 according to the invention is made possible by the moulding core 10 by means of its coupling portion 26.

Figure 7:
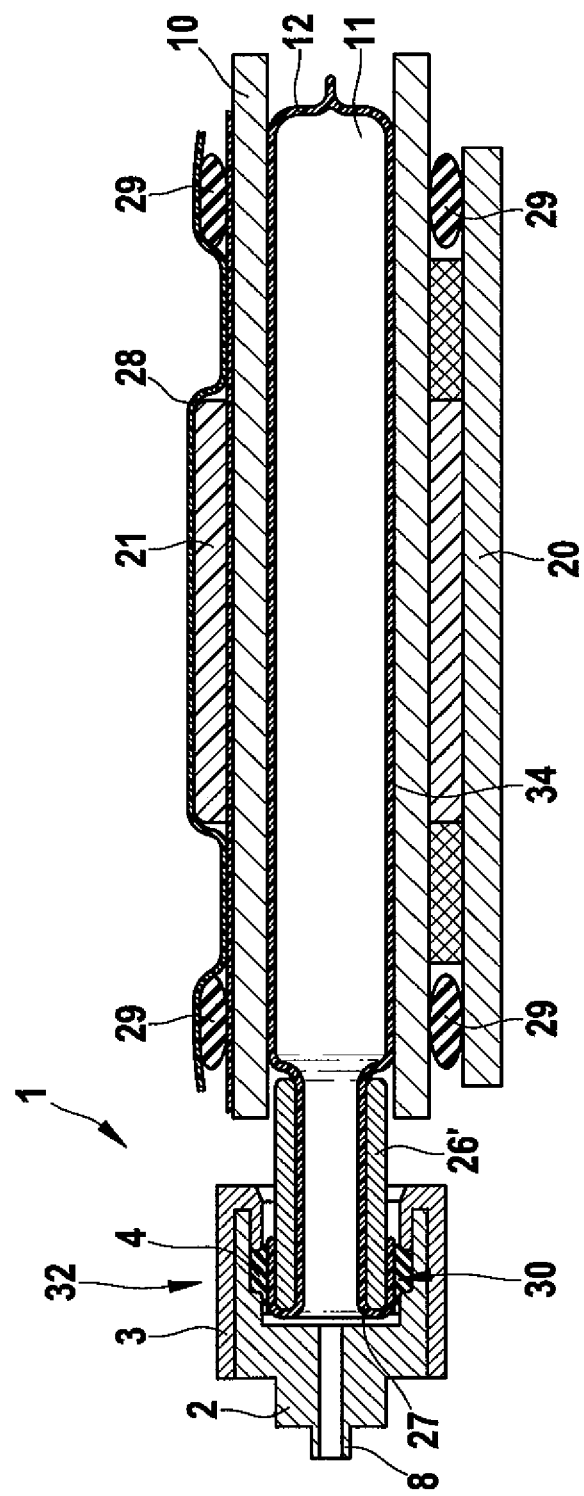
FIG. 7 shows a schematic sectional view of a second exemplary embodiment of the connection device according to the invention in the second position.
Figure 8:
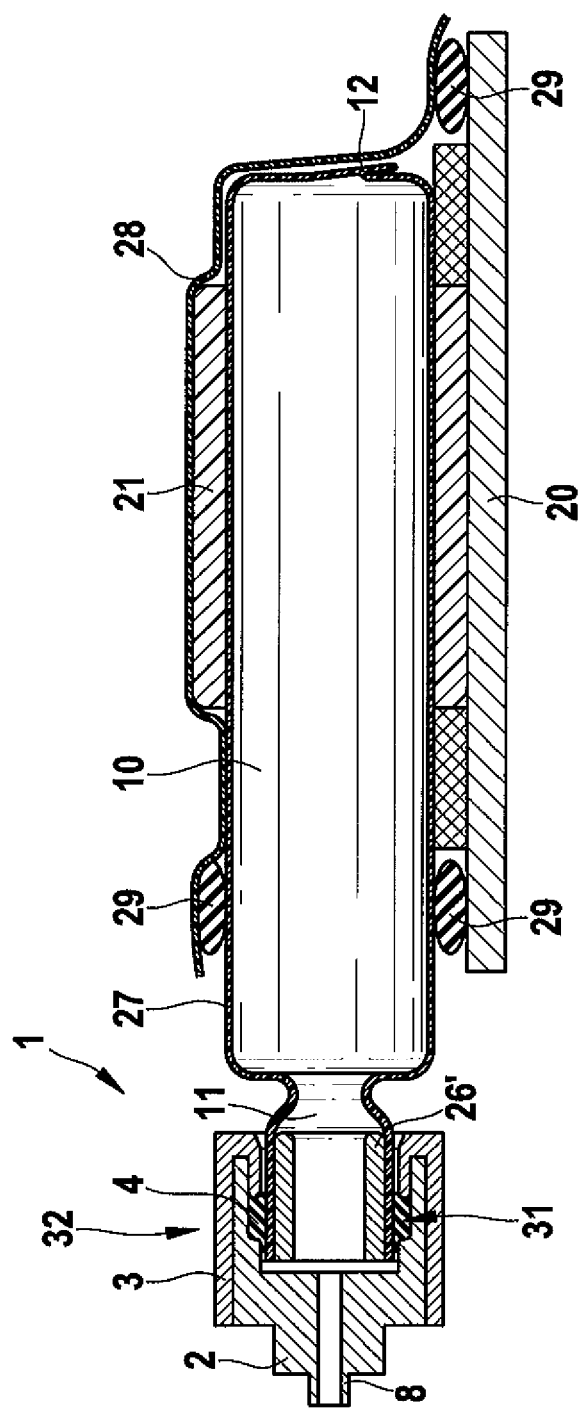
FIG. 8 shows a schematic sectional view of a third exemplary embodiment of the connection device according to the invention in the second position.

FIGS. 7 and 8 show a second and third exemplary embodiment of the connection device 1 according to the invention, for moulding cores 10 of various types.

In FIG. 7, the connection device 1 has a receiving portion 32, which just has an internal cross section that complements the external cross section of a coupling portion 26' of the moulding core 10. This coupling portion 26' is a transitional element, for example of a cylindrical shape, with respect to the moulding core 10, in the interior space 11 of which there is in this example a flexible tube 34, which is arranged through the coupling portion 26', its left-hand end forming a surround around the coupling portion 26' in the receiving portion 32 of the base element 2 of the connection device 1, on which surround the sealing element 4 rests in the way described above in a sealing manner in the locking position. The right-hand end of the flexible tube 34 is closed in a sealed manner by means of a closure 12. The coupling portion 26 is arranged with its other end in the moulding core 10. In this example in FIG. 7, the fibre composite component 21 is shown under an outer sleeve 28, which has been applied with seals 29 on the moulding core 10 or a sleeve and is required for the production method by vacuum infusion.

FIG. 8 shows a third exemplary embodiment of the connection device 1 according to the invention with a similar construction to the production of the fibre composite component 21 by the vacuum infusion method, in which the coupling portion 26' is likewise a cylindrical transitional element, as in FIG. 7. Here, however, what is known as a core sleeve 27 of the moulding core 10, which surrounds the latter from the outside, is arranged over the coupling portion 26', the sealing element 4 resting in a sealing manner in a sealing region 31 on the core sleeve 27 in the locking position. As in FIG. 7, the base element 2 has a receiving portion 32, which just has an internal cross section. This exemplary embodiment is intended inter alia for those moulding cores that have to be provided with a negative pressure during the curing process. The core sleeve 27 is closed at the other end by a closure 12.

The invention is not restricted to the exemplary embodiments described above.

For example, instead of the closure 12, a further connection device 1 is also conceivable.

Apart from air, the medium may also be a different gas.

The connection device 1 may have a further connection (not shown) for pressure monitoring.

In the case of the third exemplary embodiment as shown in FIG. 8, it is conceivable for the core material of the moulding core 10 to be mechanically cleared out. When this is being carried out, the connection device 1 may form a guide (not represented) for a tool necessary for this.

Furthermore, the geometry of the receiving portion can be modified in various ways.

It is also conceivable for the moulding core 10 to be equipped with electrical heating, which can be connected via the connection device 1.

LIST OF REFERENCE NUMERALS 1 connection device
2 base element
3 clamping element
4 sealing element
5 locking mechanism
6 connection side 7 receiving side
8 connection
9 aperture
10 moulding core
11 interior space
12 closure
13 first bevel
14 edge
15 second bevel
16 first shoulder
17 second shoulder
18 first sealing surface
19 second sealing surface
20 base plate
21 fibre composite component
22 lever
23 first pivoting point
24 second pivoting point
25 third pivoting point
26, 26' coupling portion
27 core sleeve
28 outer sleeve
29 seal
30 surround
31 sealing region
32 receiving portion
33 pressure portion
34 flexible tube
L1 transitional length
L2 useful length
p pressure

What is claimed is:

1. A moulding core assembly, comprising:

a moulding core for producing a fibre composite component for aerospace;

a base element comprising a receiving portion for receiving the moulding core via a coupling portion of the moulding core and for subjecting the moulding core to a medium;

a clamping element for fixing and sealing the coupling portion of the moulding core to the base element;

at least one sealing element arranged between the base element and the clamping element for sealing the coupling portion of the moulding core to the base element; and a locking mechanism for locking the clamping element and the coupling portion of the moulding core, wherein the locking mechanism has a clamping device with a clip and a lever; and wherein the sealing element can be compressed in a sealing manner on the surface of the coupling portion of the moulding core and on the surface of the receiving portion of the base element.

2. The moulding core assembly according to claim 1, wherein the receiving portion of the base element comprises an external cross-sectional shape adapted to an internal cross-sectional shape of the coupling portion.

3. The moulding core assembly according to claim 1, wherein the clamping element is displaceable in the longitudinal direction on the base element.

4. The moulding core assembly according to claim 3, wherein the clamping element is capable of being displaced by the locking mechanism into a first position, thereby releasing the coupling portion received in the receiving portion of the base element, and into a second position, thereby locking the coupling portion in the receiving portion of the base element.

5. The moulding core assembly according to claim 1, wherein the base element comprises at least one aperture capable of subjecting the moulding core to a medium.

6. The moulding core assembly according to claim 1, wherein the base element comprises at least one connecting mechanism capable of transmitting electrical energy from an energy source to an electrical unit of the moulding core.

* * * * *